(12) United States Patent
Cook

(10) Patent No.: US 7,619,878 B1
(45) Date of Patent: Nov. 17, 2009

(54) METER COVER FOR AUTOMATED METER READING

(75) Inventor: Jeffrey A. Cook, Santa Rosa, CA (US)

(73) Assignee: Nicor, Inc., Healdsburg, CA (US)

( * ) Notice: Subject to any disclaimer, the term of this patent is extended or adjusted under 35 U.S.C. 154(b) by 0 days.

(21) Appl. No.: 12/174,562

(22) Filed: Jul. 16, 2008

Related U.S. Application Data

(60) Provisional application No. 60/949,906, filed on Jul. 16, 2007.

(51) Int. Cl.
*G01F 15/14* (2006.01)

(52) U.S. Cl. .................... 361/672; 361/664; 361/667; 361/679.01; 220/484; 220/522; 220/3.2; 220/3.8; 137/364; 174/50; 174/17 R; 174/58

(58) Field of Classification Search ............ 361/662, 361/664, 641, 52.3, 169.6, 364, 369, 667; 361/672, 679.01; 174/17 R, 50, 38, 37, 58, 174/39, 135; 292/44, 55, 195, 202, 206, 292/212, 288, 291, 293, 294, 301; 137/364; 220/484, 501, 522, 3.2, 3.6, 3.8, 3.3, 3.5, 220/327, 328, 521, 735, 736, 697; 73/273, 73/861.77, 861.88, 272, 861.52; D10/103; 312/223.2, 223.3, 223.6, 298

See application file for complete search history.

(56) References Cited

U.S. PATENT DOCUMENTS

| | | | |
|---|---|---|---|
| D67,865 S * | 7/1925 | Armstrong | ............. D10/103 |
| 3,921,449 A * | 11/1975 | Hauffe et al. | ............... 73/273 |
| 3,952,908 A * | 4/1976 | Carson | ................ 220/484 |
| 4,048,766 A * | 9/1977 | Dantzer et al. | ................. 52/19 |
| 4,163,939 A | 8/1979 | Halstead et al. | |
| 4,556,844 A | 12/1985 | Wason | |
| D380,166 S * | 6/1997 | Burgess | ................ D10/103 |
| 6,280,805 B1 | 8/2001 | Markovich | |
| 6,316,932 B1 | 11/2001 | Horan et al. | |
| 6,414,605 B1 * | 7/2002 | Walden et al. | ......... 340/870.02 |
| 6,617,976 B2 * | 9/2003 | Walden et al. | ......... 340/870.02 |
| 6,851,567 B2 * | 2/2005 | McKinnon | ............ 220/254.3 |
| 7,381,888 B2 * | 6/2008 | Burke et al. | ................ 174/38 |
| 7,385,137 B2 * | 6/2008 | Burke et al. | ................ 174/50 |
| 7,457,051 B2 * | 11/2008 | Yoshikawa | ............... 359/726 |
| 2002/0089428 A1 * | 7/2002 | Walden et al. | ......... 340/870.02 |

* cited by examiner

*Primary Examiner*—Michael V Datskovskiy
(74) *Attorney, Agent, or Firm*—Craig M. Stainbrook; Stainbrook & Stainbrook, LLP

(57) ABSTRACT

An improved radio frequency transparent utility meter cover for an automatic meter reading (AMR) system. The cover is manufactured from a strong and chemically inert polyolefin or polypropylene copolymer and includes a non-corroding lock to secure the cover to the meter box frame. The underside of the cover includes a plurality of ribs that lend strength and rigidity to the cover while increasing mounting points for meter unit interface devices.

10 Claims, 6 Drawing Sheets

METER COVER FOR AUTOMATED METER READING

CROSS REFERENCES TO RELATED APPLICATIONS

The present application claims the benefit of the filing date of U.S. Provisional Patent Application Ser. No. 60/949,906, filed Jul. 16, 2007 (Jul. 16, 2007).

STATEMENT REGARDING FEDERALLY SPONSORED RESEARCH OR DEVELOPMENT

Not applicable.

THE NAMES OR PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND OF THE INVENTION

1. Field of the Invention

The present invention relates generally to meter covers for meters mounted in a recessed container, and more specifically to a novel underground utility meter cover constructed of a radio transparent material to enable the automated reading of utility meters.

2. Discussion of Related Art Including Information Disclosed Under 37 CFR 61.97, 1.98

Automatic meter readers (AMRs) are typically used with fluid meters, such as water and gas meters, to track the flow of a fluid through fluid meters electronically and to communicate an indication of the detected fluid flow to some external receiver via, for example, a wireless transmitter/receiver connection, a telephone wire, or some other communication channel. Once the AMR is installed, the service or fluid provider, e.g., the water or gas company, can poll the AMR from a handheld device or transmit to a remote location and receive an indication of the fluid flow measured by the meter using, for example, microwave communication, telecommunication or other communication technology embedded in the AMR. To connect an AMR to a conventional fluid meter, such as a gas/water meter, the standard mechanical meter index of the gas/water meter is removed and replaced with components of the AMR. The mechanical meter index is then reinstalled over the AMR, and the original cover is discarded and replaced with a larger cover that secures both the AMR and the mechanical meter index to the fluid meter. Installation of an AMR on most fluid meters is difficult because these meters must be partially disassembled to connect the AMR thereto. Typically, AMR covers are constructed from cast iron, steel, or polymer-concrete formulations, or, less frequently, brass and bronze. While some materials listed are radio transparent, others are less conducive to allowing transmission of radio signals. Cast iron, steel, brass and bronze covers tend to be heavy, and may require the creation of an orifice in the cover to accommodate the efficient transmission of a radio signal. That was the case in Harford County, Md., when Harford County Water and Sewer found that cast-iron lids dramatically reduced signal strength on some of its pit-mounted Itron encoder/receiver/transmitter (ERT) units. Additionally, brass and bronze will corrode over time at the hinge or at the locking mechanism. Other covers have been developed from concrete-polymer blends avoid the problems of corrosion, however without a reinforcing material the covers can crack. Mere plastic covers degrade under UV exposure and crack under pressure or float away when challenged with flood situations.

U.S. Pat. No. 6,316,932, to Horan, et al., an A-base utility meter cover assembly is described. The meter cover assembly is fabricated of a thermoplastic injection molding material, such as polycarbonate, and includes a base cover covered by a terminal cover. In one embodiment, the base cover includes a terminal block cavity for receiving a utility meter terminal block, and two locking tabs and a snap portion which engage openings through the terminal cover when the base cover and terminal cover are in an assembled configuration. In the assembled configuration, a dam and deflectors on the terminal cover are aligned with ribs on the base to form a continuous barrier against water flow into the terminal block cavity. The configuration of the locking tabs and snap portion also protect against tampering with meter electronics by preventing removal of the terminal cover.

U.S. Pat. No. 6,280,805, to Markovich, describes utility meter cover apparatus is provided for protecting an existing utility meter casing from vandalism. The cover apparatus includes a generally tubular base adapted to be received over an end wall of the casing and permanently fixed to the casing by an adhesive or the like. The base includes an end opening that provides access to the end wall of the casing and to the window and any hardware mounted in the end wall. A cover is sized for receipt on the base over the end opening, and is movable relative to the base between a closed position covering the end opening and an open position exposing the end opening. A lock assembly is connected between the base and the cover, and is shiftable between a locked position in which the cover cannot be moved from the closed position and an unlocked position in which the cover can be moved to the open position to allow access to the end face of the meter casing.

U.S. Pat. No. 4,556,844, to Wason, discloses a pair of spring clips snapped onto existing elements of a visual indicator such as the dial of a utility meter. An encoder having attachment elements with a spacing there between corresponding to the spacing between the clips is attached to the clips to quickly, easily, and precisely attach the encoder to the dial in properly aligned position.

U.S. Pat. No. 4,163,939, to Halstead, et al., describes an electric utility meter and includes a detachable anti-static plastic cover having an electroconductive layer on the cover front face. The conductive layer extends between the cover and a dial pointer of the meter. An electric contact projects into the interior of the cover so as to make contact with the meter chassis when the cover is assembled to the meter.

The aforementioned patents provide utility meter covers for differing purposes, including protection from vandalism, electrostatic charges or as weather barriers, however, none teach a cover manufactured of a proprietary radio frequency (RF) transparent polypropylene copolymer that combines durability, UV resistance and corrosion resistance. Additionally the utility meter cover of the present invention utilizes a primary and secondary system for securing the cover to a base.

The foregoing patents reflect the current state of the art of which the present inventor is aware. Reference to, and discussion of, these patents is intended to aid in discharging Applicant's prospective duty of candor in disclosing information during examination that may be materially relevant to the allowability of claims to the present invention. However, it is respectfully submitted that none of the above-indicated patents disclose, teach, suggest, show, or otherwise render obvious, either singly or when considered in combination, the invention described herein.

BRIEF SUMMARY OF THE INVENTION

The present invention is an improved RF transparent utility meter cover for use in an automatic meter reading (AMR) system.

It is therefore an object of the present invention to provide a new and improved utility meter cover manufactured of a RF transparent polyolefin or polypropylene copolymer.

It is another object of the present invention to provide a new and improved utility meter cover that utilizes a locking mechanism to secure the cover.

A further object or feature of the present invention is a new and improved utility meter cover that utilizes magnetic hold downs to provide secondary means for securing the cover.

An even further object of the present invention is to provide a novel rib design that provides strength and rigidity, while providing a variety of attachment options for AMR devices.

It is yet a further object of the present invention to provide a utility meter cover that provides a variety of attachment options for AMR devices.

The RF transparent utility cover can conform to any shape, depending upon the injection mold used to match the specific utility meter box or pit box shape. The RF transparent utility cover is preferably constructed of a material called "No Break", which is a polypropylene co-polymer bearing product number Basell 8523 produced by Basell Polyolefins, of Corporate Centre, Basell Holdings B. V., Hoeksteen 66, PO Box 625, 2130 AP Hoofddorp, Hoofddorp, Netherlands 2130. Other materials may be specified, though the Basell polyolefin is RF transparent to allow transmission of RF signal from a transmitting meter to an AMR, and it is also weather resistant and strong, bearing up well under considerable loads under a temperature range of –40° F. and 180° F. The RF transparent utility cover has a locking mechanism which may utilize a penta bolt, a slot for a screwdriver of a keyed entry mechanism. The locking mechanism may be a worm gear or a spring biased latch assembly. The bottom surface of the RF transparent utility cover utilizes a generally circular external annular rib and a circular internal annular rib joined by a plurality of radially extending ribs. The external annular rib is slightly smaller in diameter than the diameter of the RF transparent utility cover top, creating a seating lip for placement into a meter box or pit frame. The depth of the external annular rib may be varied, depending on the depth of the pit frame or meter box into which it will be placed. A retention tab is positioned 180° from the locking mechanism. The retention tab inserts into a slot in the pit frame to provide and anchor and a pivot for the RF transparent utility cover. A series of cylindrical or conical stand-offs and clip retainers are arranged on the bottom surface of the RF transparent utility cover to serve as screw mounts and secondary mounting means for accommodating different brands of AMR devices. Magnetic fasteners may be attached to the seating lip to provide a secondary means of attachment if the RF transparent utility cover is left unlatched. This will prevent the accidental detachment of the RF transparent utility cover in flooding situations.

The foregoing summary broadly sets out the more important features of the present invention so that the detailed description that follows may be better understood, and so that the present contributions to the art may be better appreciated.

There are additional features of the invention that will be described in the detailed description of the preferred embodiments of the invention which will form the subject matter of the claims appended hereto.

Accordingly, before explaining the preferred embodiment of the disclosure in detail, it is to be understood that the disclosure is not limited in its application to the details of the construction and the arrangements set forth in the following description or illustrated in the drawings. The inventive apparatus described herein is capable of other embodiments and of being practiced and carried out in various ways.

Also, it is to be understood that the terminology and phraseology employed herein are for descriptive purposes only, and not limitation. Where specific dimensional and material specifications have been included or omitted from the specification or the claims, or both, it is to be understood that the same are not to be incorporated into the claims, when and as filed.

As such, those skilled in the art will appreciate that the conception, upon which this disclosure is based may readily be used as a basis for designing other structures, methods, and systems for carrying out the several purposes of the present invention. It is important, therefore, that the claims are regarded as including such equivalent constructions as far as they do not depart from the spirit and scope of the present invention. Rather, the fundamental aspects of the invention, along with the various features and structures that characterize the invention, are pointed out with particularity in the claims annexed to and forming a part of this disclosure. For a better understanding of the present invention, its advantages and the specific objects attained by its uses, reference should be made to the accompanying drawings and descriptive matter in which there are illustrated the preferred embodiment.

BRIEF DESCRIPTION OF THE SEVERAL VIEWS OF THE DRAWINGS

The invention will be better understood and objects other than those set forth above will become apparent when consideration is given to the following detailed description thereof. Such description makes reference to the annexed drawings wherein.

DRAWING REFERENCE NUMERALS

Figure 1:
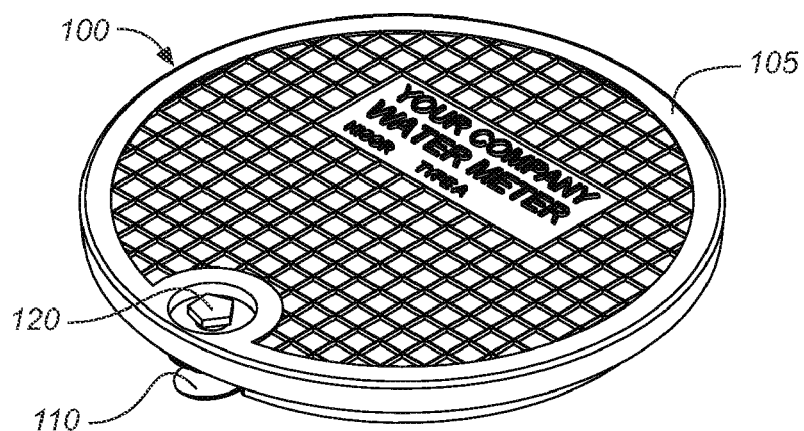
FIG. 1 is an upper perspective view of a first preferred embodiment of the RF transparent utility cover of the present invention.
Figure 2:
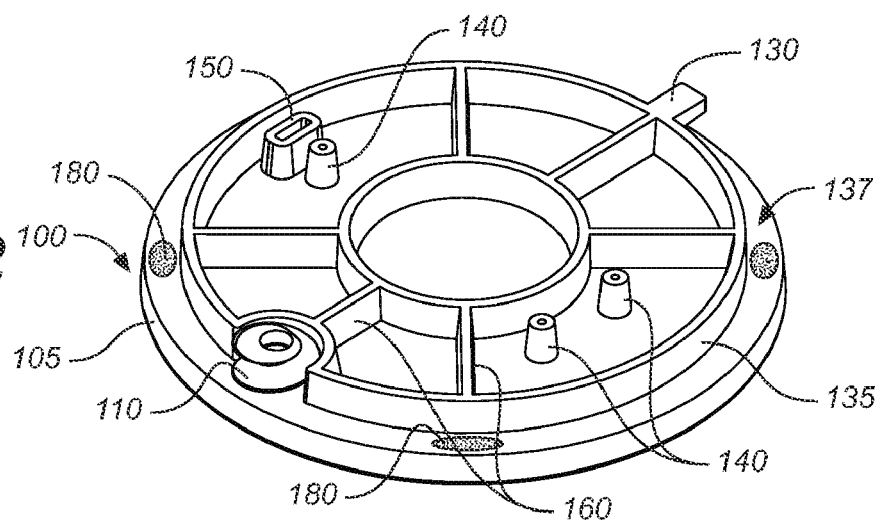
FIG. 2 is a lower perspective view showing the bottom surface thereof.
Figure 3:
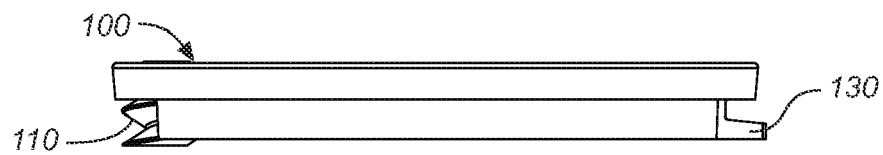
FIG. 3 is a side view in elevation thereof.
Figure 4:
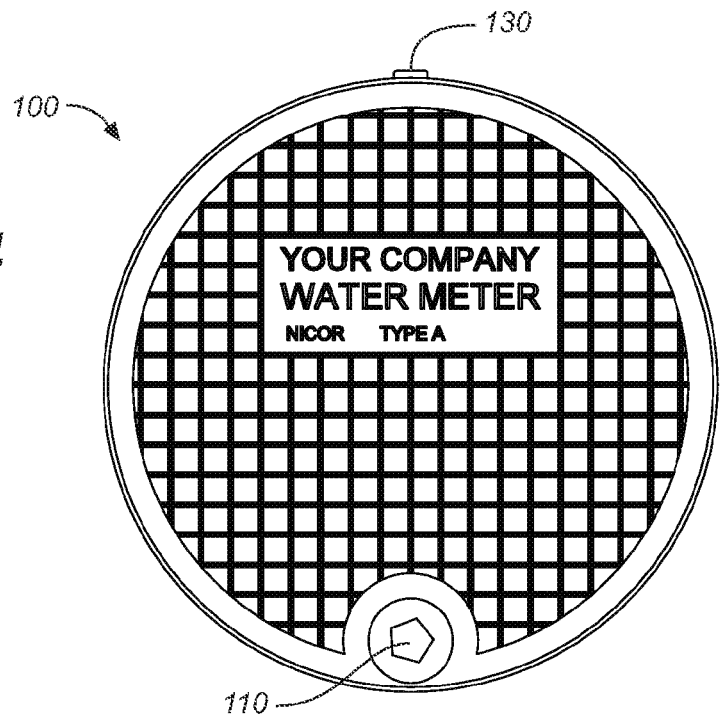
FIG. 4 is a top plan view thereof.
Figure 5:
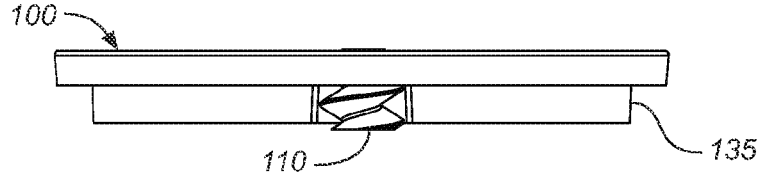
FIG. 5 is a top end view in elevation showing the worm gear latch of the first preferred embodiment.
Figure 6:
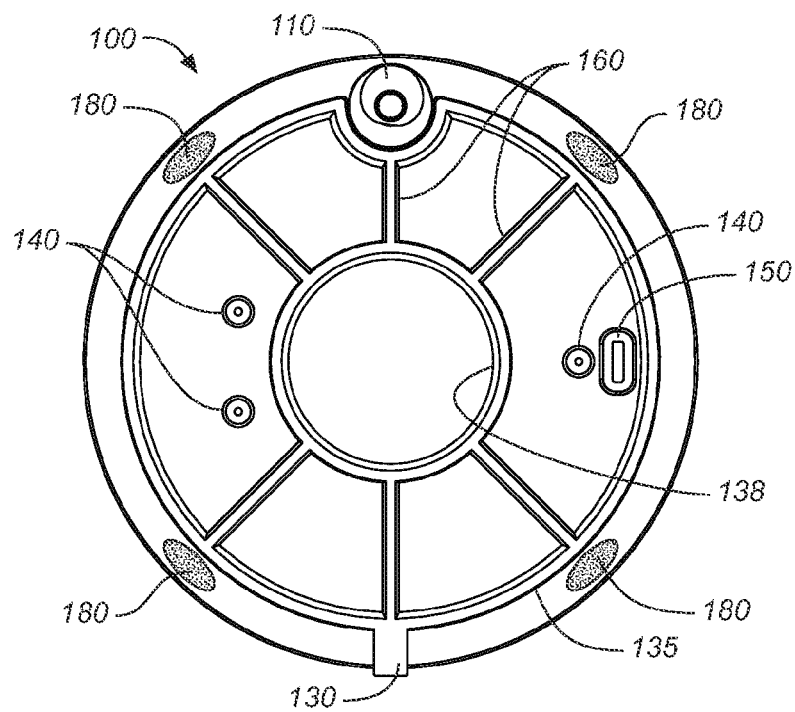
FIG. 6 is a bottom view of the RF transparent utility cover.

FIGS. 1-18
- 100, first preferred embodiment, generally, of RF transparent utility lid or cover
- 100A, second preferred embodiment
- 100B, third preferred embodiment
- 110 locking mechanism
- 120 locking mechanism actuator
- 130 retention tab
- 135 external annular rib
- 137 seating lip
- 138 internal radius rib
- 140 mounting bracket stand-offs
- 150 clip retainers
- 160 radial ribs
- 180 magnetic fasteners
- 200 fourth preferred embodiment, generally
- 210 spring-biased latch
- 220 key
- 230 external annular rib
- 240 internal annular
- 250 medial annular rib
- 260 radially extending ribs
- 270 shaft for latch
- 280 key push plate
- 290 spring
- 300 keyhole
- 310 insertable locking portion of latch shaft

DETAILED DESCRIPTION OF THE INVENTION

Referring to FIGS. 1 through 18, wherein like reference numerals refer to like components in the various views, there is illustrated therein a new and improved RF transparent utility cover or lid for use in an automatic meter reading system, the first preferred embodiment of which is generally denominated 100 herein.

The figures show the various preferred embodiments of the inventive AMR system lid which, in each instance, comprises a generally discoid shaped RF transparent utility cover with a top surface, a bottom surface and radius edge. The lid is adapted for placement over a below grade meter box or pit frame in which a utility meter is disposed.

Referring first to FIGS. 1-6, in a first preferred embodiment 100 the RF transparent AMR system lid can conform to any shape and be adapted for use on any shape of meter box. The RF transparent utility cover is preferably constructed of a material called Hydrozone HD, a polypropylene co-polymer produced by Bassel, Inc. This material is strong, weather resistant and RF transparent to allow transmission of RF signal from a transmitting meter to an automatic meter reader. The RF transparent utility cover 100 has a generally planar upper portion 105, and upon its top surface, near the outer edge or radius, a cylindrical recess or depression which houses a locking mechanism actuator 120 for the locking mechanism 110. The locking mechanism may be actuator by an actuator 120, such as a penta bolt (shown), or using a keyed entry mechanism accessed through a small cover plate having a slot for a screwdriver to lift the plate. The locking mechanism 110 in a first preferred embodiment is a rotatable polymer worm gear that is sized and positioned at the edge of the cover for lockable engagement with a meter box frame. The polymer material does not corrode or freeze to the pit frame or meter box frame, as do prior art locks employed in meter covers now in use, so removal of the lid is relatively easy, even in harsh wet environments. No other meter lids known to date employ such a material for lid locking. In other embodiments (further described below in relation to FIGS. 13-17) a spring-biased latch assembly may be employed as a locking mechanism. The bottom surface of the RF transparent utility cover 100 utilizes a generally circular external annular (or radius) rib 135 and a circular internal annular (radius) rib 138, coaxial with the external annular rib 135, and joined by a plurality of radial ribs 160. The external annular rib 135 is slightly smaller in diameter than the diameter of the RF transparent utility cover top, creating a seating lip 137 for placement into a valve box or pit frame. Additionally, the external annular rib 135 includes a semicircular portion generally disposed around the locking mechanism 110 to provide added rigidity to the RF transparent utility lid 100 in the area of the locking mechanism. The depth of the external annular rib 135 may be varied, depending on the depth of the pit frame into which it will be placed. A retention tab 130 is positioned opposite the locking mechanism 110 on the outer edge or the external radius rib 135 (generally 180° around the lid from the locking mechanism in the case of a discoid cover). The retention tab 130 inserts into a slot in the pit frame or meter box to provide and anchor and a pivot for the RF transparent utility cover.

A series of mounting bracket stand-offs 140 are arranged on the bottom surface of the RF transparent utility cover 100 to serve as screw and/or clip mounts for accommodating different brands of AMR devices. As will be appreciated, a number of different mounting brackets may be employed and are called for according to the installation specifications for the AMR device employed. Typical bracket configurations or styles include Z-brackets and U-brackets. Custom shapes may also be employed.

As an example, the NEPTUNE R900® and NEPTUNE R450® meter interface units made by Neptune Technology Group Inc. of Tallassee, Ala., each call for the use of both a Z- and a U-bracket, while the Itron 50W®, 60W®, and 200W™ meter interface units, made by Itron, Inc of Spokane Valley, Wash., each call for either a Z- or a U-bracket. Aclara Technologies, Inc. of Hazelwood, Mo., and Datamatic, Ltd., of Plano, Tex., each make MUIs that call for mounting with a Z-bracket, while Sensys Networks, Inc., of Berkeley, Calif. uses a U-bracket. The MUIs made by Elster AMCO Water, Inc., of Ocala, Fla. require a modified Z-bracket. As will be appreciated, the various MUIs call for a mounting bracket fitted to the system mounting elements, which is why a versatile stand-off configuration is provided in the present invention. Not only does this facilitate mounting of a particularly selected bracket, but swapping and changing brackets does not then require the purchase of a new meter cover.

In addition, spaced apart clip retainers 150 are disposed at intervals on the bottom of the RF transparent utility cover 100 to function as a secondary mounting structure for AMR devices. Furthermore, magnetic fasteners 180 are attached to the seating lip to provide a secondary means of attachment if the RF transparent utility cover is left unlatched. This will prevent the accidental detachment of the RF transparent utility cover in high water conditions.

Figure 7:
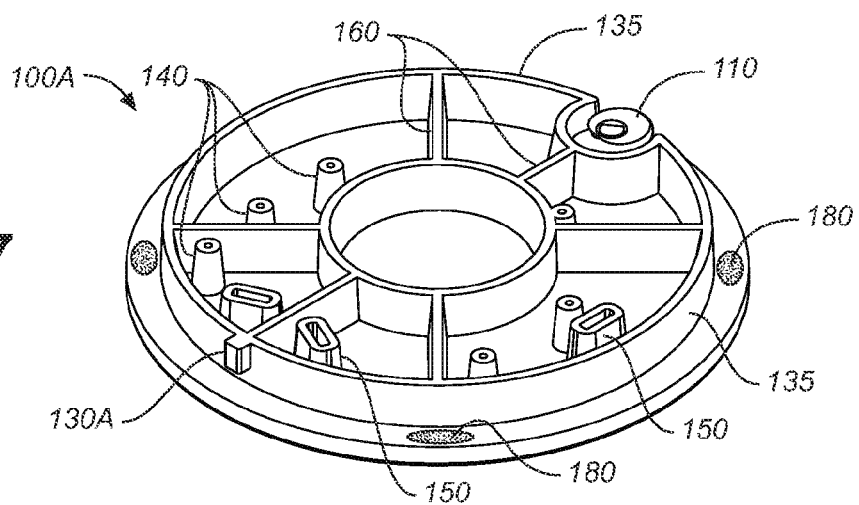
FIG. 7 is a bottom perspective view of a second preferred embodiment of the RF transparent utility cover of the present invention, showing an alternate ARM attachment pattern.
Figure 8:
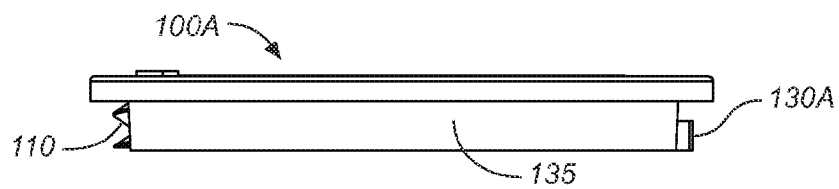
FIG. 8 is a side view in elevation thereof.
Figure 9:
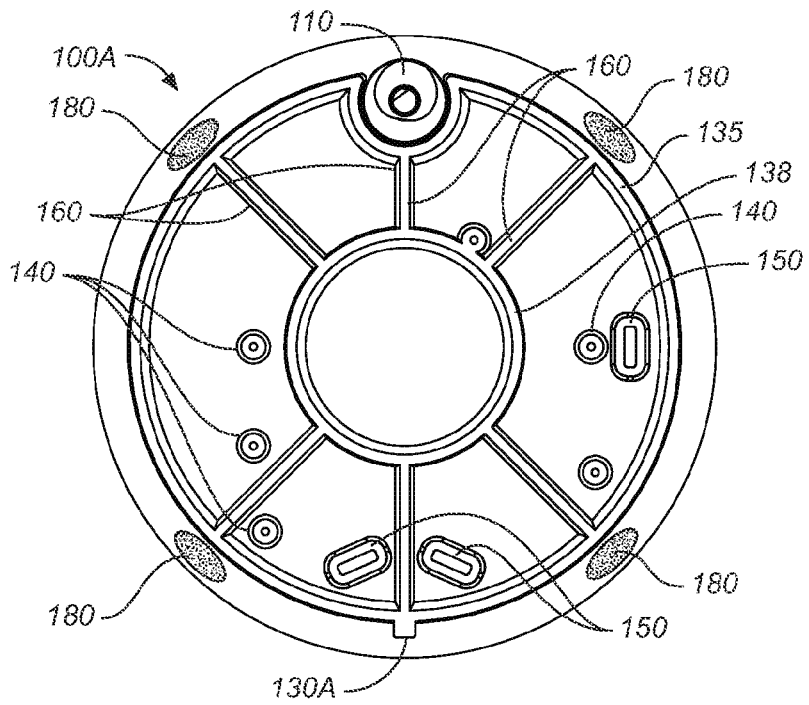
FIG. 9 is a bottom view thereof.

Referring next to FIGS. 7-9, in a second preferred embodiment 100A the inventive AMR system lid incorporates all of the features of the first preferred embodiment, shown in FIGS. 1-6, except that the stand-offs 140 and the clip retainers 150 are arranged to accept a different kind of AMR device.

Figure 10:
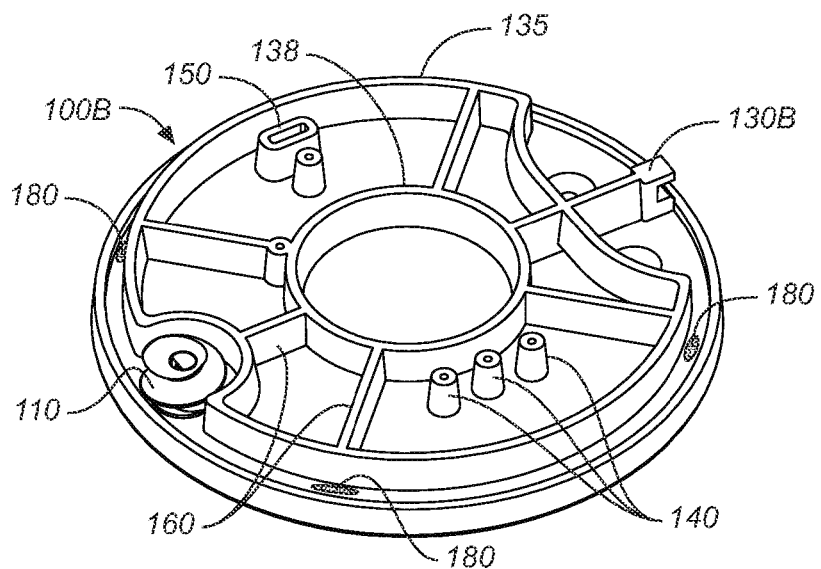
FIG. 10 is a lower perspective view of the bottom of a third preferred embodiment of the RF transparent utility cover, showing a second alternate ARM attachment pattern.
Figure 11:
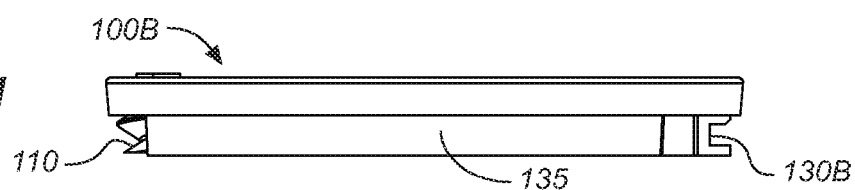
FIG. 11 is a side view in elevation thereof.
Figure 12:
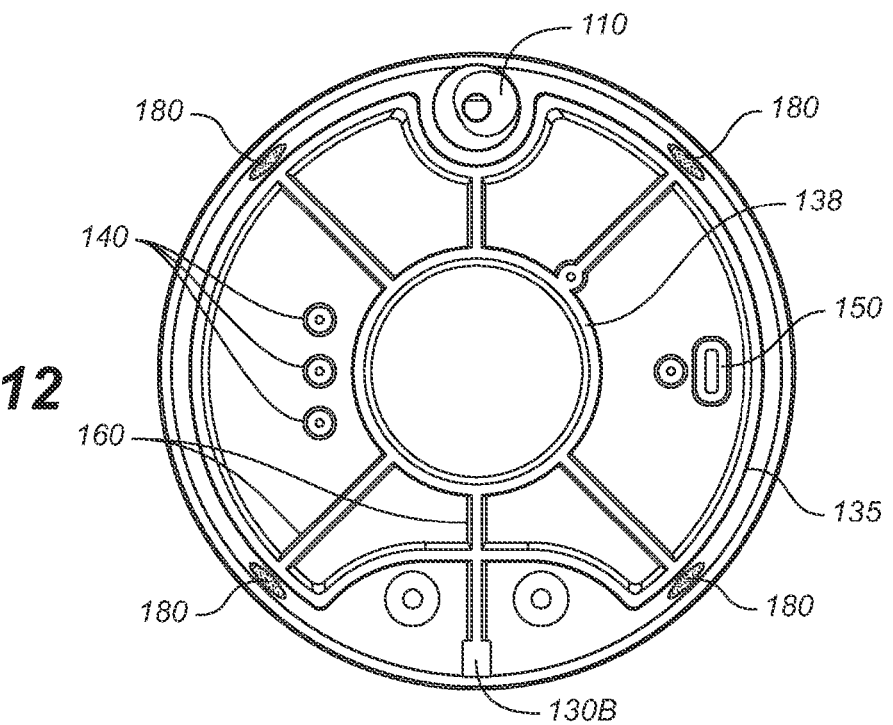
FIG. 12 is a bottom view thereof.
Figure 13:
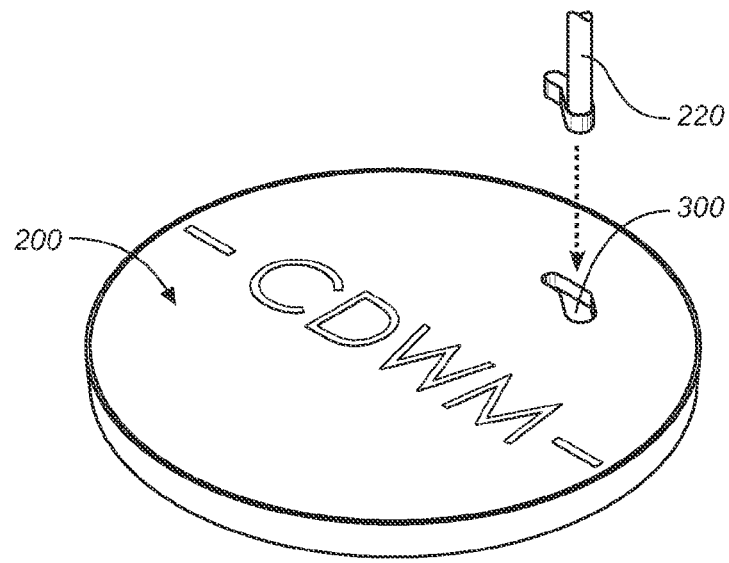
FIG. 13 is an upper perspective view of a fourth preferred embodiment of the RF transparent utility cover of the present invention.
Figure 14:
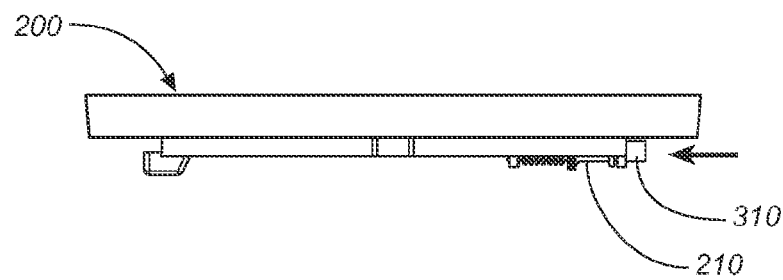
FIG. 14 is a side view in elevation thereof.
Figure 15:
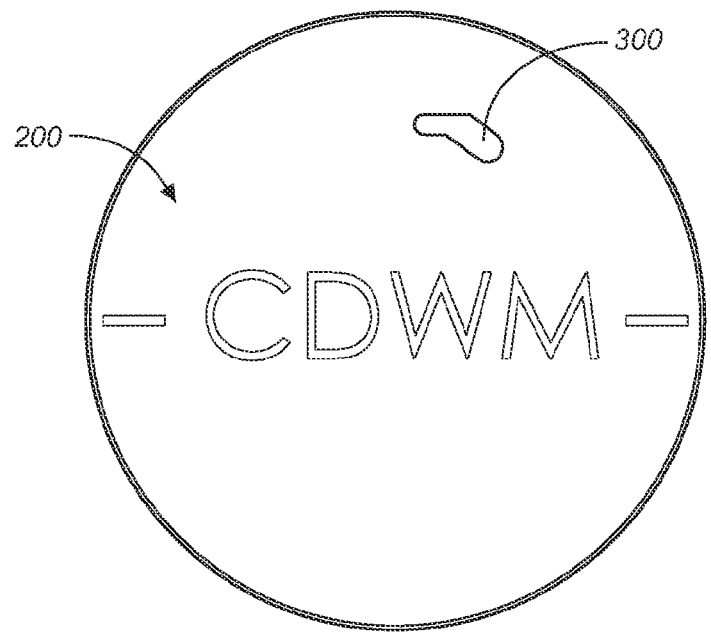
FIG. 15 is a top plan view thereof.
Figure 16:
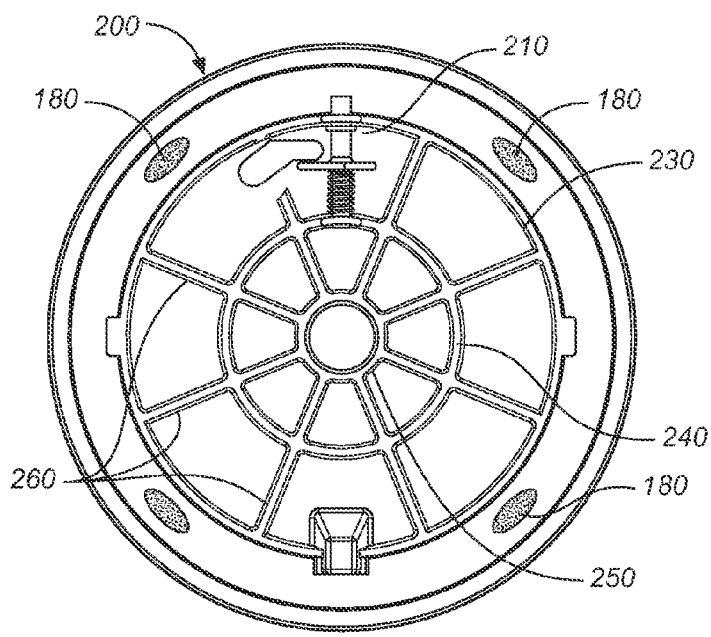
FIG. 16 is a bottom view thereof.
Figure 18:
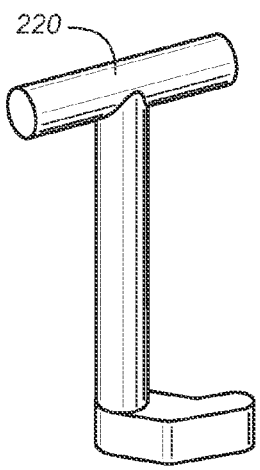
FIG. 18 shows a suitable key for opening the latch of the fourth preferred embodiment.
Figure 17:
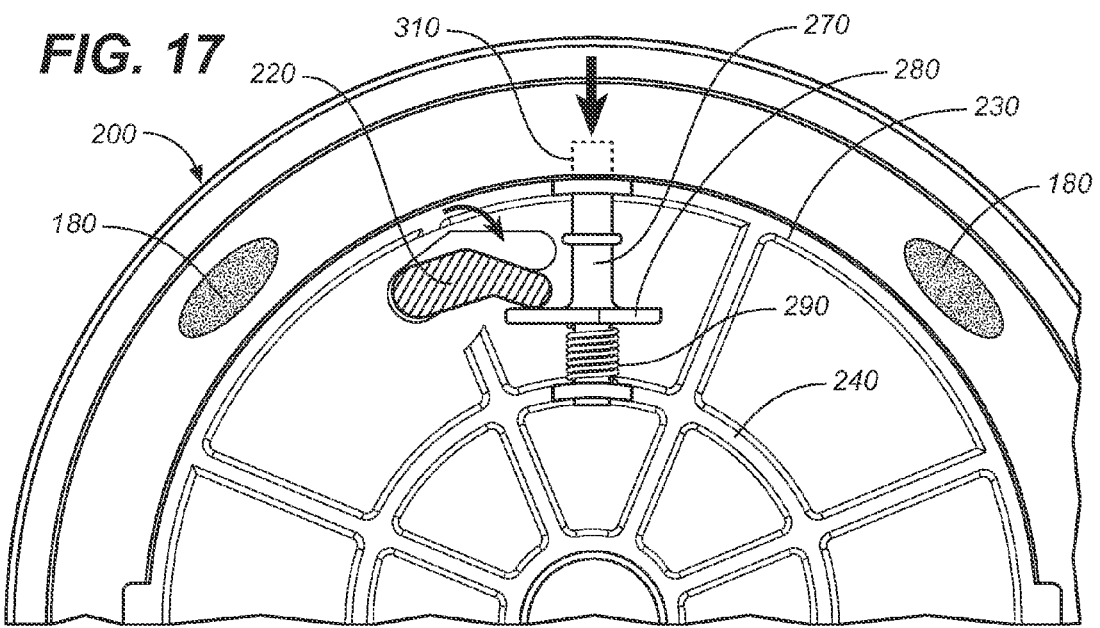
FIG. 17 is a detailed bottom view showing the spring biased latch of the fourth preferred embodiment.

Referring next to FIGS. 10-12, a third preferred embodiment 100B the inventive AMR system lid incorporates all of the features of the first and second preferred embodiments, shown in FIGS. 1-9, with the exception that the stand-offs 140 and the clip retainers 150 are arranged to accept yet another kind of AMR device. Additionally, the external annular rib 135 deviates inwardly in a half ellipse, 180° from the locking mechanism 110, to accommodate the attachment of a hinge assembly that may be attached to a meter box frame.

In a fourth preferred embodiment, 200, shown in FIGS. 13-18, the inventive AMR system lid is provided with a spring-biased latching apparatus 210 that calls for the use of an insertable key 220 for actuation and unlocking. In this embodiment, the underside of the lid includes an external annular rib 230, an internal annular 240, and a medial annular rib 250 disposed therebetween. The annular ribs are connected by a plurality of radially extending ribs 260. The spring-biased latching mechanism comprises a shaft 270 journaled at one end through the external annular rib, and at the opposite end through the medial annular rib. The shaft includes a fixed key push plate 280 normal to the longitudinal axis of the shaft, and a spring 290 is disposed axially over the shaft between the key push plate and the medial annular rib. When key 220 is inserted through keyhole 300, the latching portion 310 of shaft 270 used to lock the lid onto a meter box may be disengaged from the meter box so that the lid may be removed.

In each of the above-described embodiments, the AMR lid is fabricated from a polyolefin material. The ideal material includes a number of desirable properties, including the following: (1) it has a density-specific gravity of 0.902, under ASTM D 792; (2) it has a melt flow rate of 4.00 g/10 min. (under ASTM D1238, 230 degrees C./2.16 kg); (3) it has a tensile strength@yield of 3100 psi, 21.4 MPa, (under ASTM D 638, 2 in/min or 50 mm/min); (4) it has a flexural modulus of 140,000 psi, 965 MPa (under ASTM D 790, 0.05 in/min, 1 mm/min, 1% secant, procedure A); (5) it has a tensile elongation of 8% (under ASTM D 638); (6) it does not break in the notched Izod impact strength test (under ASTM D 256, 73 degrees F., 23 degrees C., method A); (7) it has a Rockwell Hardness® scale) of 65 (under ASTM D 785); (8) it has a deflection temperature under load (DTUL) of 81.1 degrees C. (at 66 psi unannealed under ASTM D 648); and (9) it has a drop weight impact strength of greater than 45 ft-lbs at −29 degrees C. under the Bosell test. A suitable material is found in the polyolefin produced by Basell Polyolefins, which is a unit of Basell Holdings B.V., of Hoofddorp, Netherlands. However, the Basell 8523 Polyolefin material is preferably adapted for use as an AMR cover. Thus, to make the performance characteristics of the Basell 8523 polyproplyene co-polymer more well suited for AMR lid use, it may be enhanced by adding up to 20% by weight of silica-based short glass to the above-described polyolefin material.

Potential alternative materials include polyethylene, but this material becomes brittle in cold temperatures. Polyester may also be used, but it is expensive and may crystallize and crack if not properly molded. This is true, also, of nylon 66 or 610. Fiberglass may be employed, but it degrades when exposed to ultraviolet light and cold weather causes it to absorb water and crack.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Therefore, the above description and illustrations should not be construed as limiting the scope of the invention, which shall be defined by claims when and as filed.

What is claimed as invention is:

1. A meter box lid for use in an automatic meter reading system disposed in a below grade meter box, comprising:
   a chemically inert, non-corrosive RF transparent utility cover having a generally planar top surface, a bottom surface, and an outer edge, wherein said bottom surface includes a seating lip and a plurality of ribs;
   a locking mechanism disposed proximate said outer edge for locking engagement with a compatible element in the meter box; and
   a plurality of mounting bracket stand-offs disposed on said bottom surface for mounting one or more of numerous different kinds of automated meter reading meter interface unit devices.

2. The meter box lid of claim 1, wherein said lid is fabricated from a polypropylene co-polymer.

3. The meter box lid of claim 1, wherein said lid is fabricated from polyolefin.

4. The meter box lid of claim 1, wherein said locking mechanism is a rotatable polymer worm gear.

5. The meter box lid of claim 1, wherein said locking mechanism is a spring-biased latch assembly.

6. The meter box lid of claim 1, wherein said lid is generally circular and said ribs include a generally circular external annular rib, a circular internal annular rib coaxial with said external annular rib, and a plurality of radially extending ribs joining said external annular rib and said internal annular rib.

7. The meter box lid of claim 6, wherein said external annular rib is slightly smaller in diameter than said cover top, thereby creating a seating lip for placement into the meter box.

8. The meter box lid of claim 7, further including magnetic fasteners attached to said seating lip.

9. The meter box lid of claim 6, wherein said external annular rib includes a semicircular portion generally disposed around said locking mechanism.

10. The meter box lid of claim 1, further including a retention tab positioned on the opposite side of said cover from said locking mechanism for insertion into a slot in the meter box frame.

* * * * *